(No Model.)
A. W. SIBLEY.
THILL COUPLING.
No. 358,577. Patented Mar. 1, 1887.
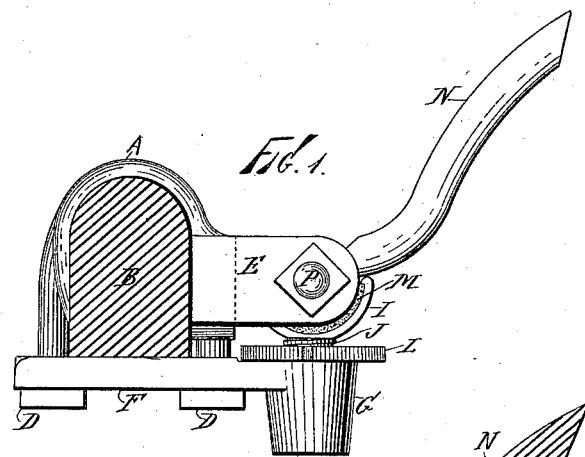
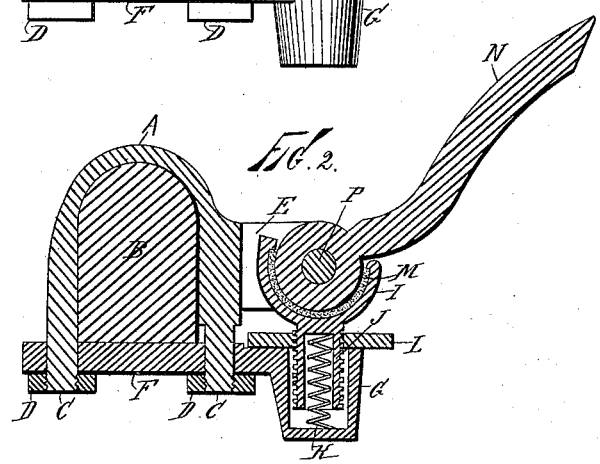
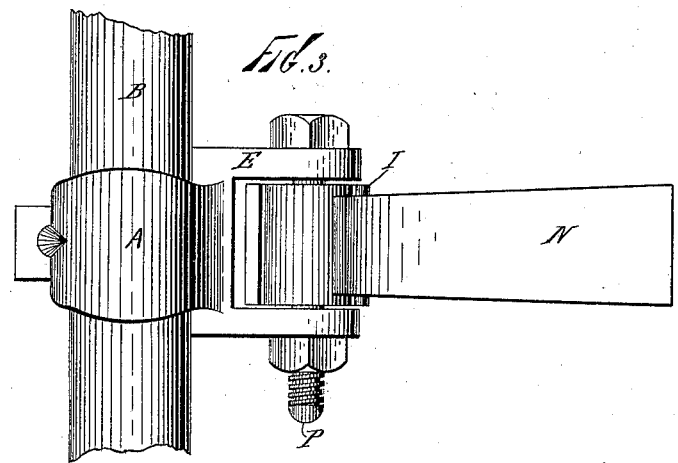
Witnesses:
John Buckle,
M. E. Roberts.
Inventor:
A. W. Sibley,
By A. M. Pierce,
Attorney.

UNITED STATES PATENT OFFICE.

AUGUSTINE W. SIBLEY, OF STAMFORD, CONNECTICUT.

THILL-COUPLING.

SPECIFICATION forming part of Letters Patent No. 358,577, dated March 1, 1887.

Application filed January 17, 1887. Serial No. 224,549. (No model.)

*To all whom it may concern:*

Be it known that I, AUGUSTINE W. SIBLEY, a citizen of the United States, and a resident of Stamford, in the county of Fairfield and State of Connecticut, have invented certain new and useful Improvements in Thill-Couplings, of which the following is a specification.

My invention relates especially to devices employed for connecting the thills of carriages, &c., to the axle, and has for its object the provision of a thill-coupling which may be used with the ordinary axle-clips now employed, cheap and simple to construct, easy to apply and adjust, and noiseless in use.

To attain the desired end my invention consists, essentially, in the combination, with an ordinary axle-clip, of a box or seat formed upon the clip-bar, a spring-support located in said box, adjustably holding a flexible pad against the eye of the thill-iron, all of which will be hereinafter first fully described, and then pointed out in the claims.

In the drawings, Figure 1 is a side elevation of my improved coupling. Fig. 2 is a longitudinal vertical sectional view thereof, and Fig. 3 is a plan view of the same.

Like letters of reference, wherever they occur, indicate corresponding parts in all the figures.

A is the clip passing over the axle B, said clip being provided with clamping-bolts C, nuts D, and ears E, in the usual manner.

F is the clip-bar, through which the bolts C pass, said bar F terminating in a box, seat, or hollow bearing, G, wherein is supported the vertical hollow stem H of the adjustable yoke I. The hollow stem H contains a spring or springs, K, and is screw-threaded upon its exterior, in order to engage with a milled adjusting-nut, L, which rests upon the upper side of the clip-bar F. Within the yoke I is seated an elastic cushion, M, which presses against the eye of the thill-iron N, secured in eyes E of the clip by a horizontal bolt, P.

When constructed and arranged in accordance with the foregoing description, my improved thill-coupling will be found admirably adapted to the uses and purposes for which it is intended.

It is not necessary to use any special form of axle-clip in order to apply my device. The coupling is safe, compact, simple, noiseless, and durable. The wear upon the cushion may be instantly taken up by means of the nut L, and the spring within the stem H of yoke I insures a constant pressure against the thill-iron.

Having now fully described my invention, what I claim as new therein, and desire to secure by Letters Patent, is—

1. In a thill-coupling of the character herein specified, the combination, with the axle-clip, of the clip bar having a box formed upon its outer extremity, wherein is supported an adjustable yoke, the stem of said yoke resting upon a spring within the box, and the yoke containing a flexible cushion bearing against the eye of the thill-iron, substantially as shown and described.

2. An anti-rattling thill-coupling consisting of a clip, A, clip-bar F, having a box, G, upon its outer extremity, yoke I, provided with a hollow screw-threaded stem, H, spring K, adjusting-nut L, cushion M, and thill-iron N, the whole combined and arranged substantially as shown and described.

3. In a thill-coupling, an elastic pad supported upon a stem formed with the pad-yoke and extending vertically into a box formed on the clip-bar, a spring acting upon the yoke-stem within the box, an adjusting-nut being located thereabove, substantially as shown and described.

Signed at Stamford, in the county of Fairfield and State of Connecticut, this 4th day of January, A. D. 1887.

AUGUSTINE W. SIBLEY.

Witnesses:
 LOUIS M. FRENCH,
 E. W. RIKER.